(12) United States Patent
Danielli

(10) Patent No.: US 6,425,188 B1
(45) Date of Patent: Jul. 30, 2002

(54) OPTOELECTRIC APPARATUS FOR THE DIMENSION AND/OR SHAPE CHECKING OF PIECES WITH COMPLEX TRIDIMENSIONAL SHAPE

(75) Inventor: Franco Danielli, Zola Predosa (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 09/529,733

(22) PCT Filed: Oct. 9, 1998

(86) PCT No.: PCT/EP98/06425

§ 371 (c)(1),
(2), (4) Date: Apr. 19, 2000

(87) PCT Pub. No.: WO99/24785

PCT Pub. Date: May 20, 1999

(30) Foreign Application Priority Data

Jul. 11, 1997 (IT) .......................................... B097A0661

(51) Int. Cl.⁷ .............................................. G01B 11/24
(52) U.S. Cl. ...................... 33/547; 33/501.02; 33/1 BB
(58) Field of Search .............................. 33/501.02, 503, 33/549, 551, DIG. 4, 1 BB; 250/559.22; 356/2, 450, 496, 511, 625, 627, 628

(56) References Cited

U.S. PATENT DOCUMENTS

| | | | | |
|---|---|---|---|---|
| 4,164,694 A | * | 8/1979 | Amsbury et al. | 33/551 |
| 4,343,553 A | * | 8/1982 | Nakagawa et al. | 250/559.22 |
| 4,417,816 A | * | 11/1983 | Kindl et al. | 33/DIG. 4 |
| 5,146,690 A | * | 9/1992 | Breitmeier | 33/551 |
| 5,542,188 A | | 8/1996 | Ertl et al. | 33/549 |
| 5,588,216 A | * | 12/1996 | Rank et al. | 33/549 |
| 5,865,769 A | * | 2/1999 | Case et al. | 33/551 |

FOREIGN PATENT DOCUMENTS

| | | |
|---|---|---|
| EP | 0 686 829 | 12/1995 |
| GB | 2 058 344 | 4/1981 |
| JP | 06265334 | 9/1994 |
| WO | WO 87/07007 | 11/1987 |

* cited by examiner

Primary Examiner—G. Bradley Bennett
(74) Attorney, Agent, or Firm—Dickstein Shapiro Morin & Oshinsky, LLP

(57) ABSTRACT

An optoelectronic apparatus for the dimension and/or shape checking of pieces, more specifically pieces with complex tridimensional shape, as the supports for magnetic read/write heads (33, 47, 63) for hard disk storage units, comprises a base (1) with two guide elements (7, 9) to which there is coupled a slide (11), movable in a longitudinal direction along the guide elements (7, 9), and a system (31) for locking and referring the piece (33, 47, 63) to be checked. The slide (11) supports a rotary table (13), to which there is fixed a support (15) for an optoelectronic measuring system. Rotational displacements of the rotary table (13) about an axis parallel to the guide elements (7, 9) make the optoelectronic measuring system oscillate substantially in a plane perpendicular to said axis for optimizing the reciprocal arrangement between the components (75, 77) of the optoelectronic measuring system and the piece (33, 47, 63) in the course of the checking. It is possible to check pieces (33, 47, 63) with different shape and nominal dimensions by replacing just some elements of the apparatus.

20 Claims, 8 Drawing Sheets

OPTOELECTRIC APPARATUS FOR THE DIMENSION AND/OR SHAPE CHECKING OF PIECES WITH COMPLEX TRIDIMENSIONAL SHAPE

TECHNICAL FIELD

The present invention relates to an optoelectronic apparatus for the dimension and/or shape checking of pieces including a plurality of substantially planar and mutually parallel surfaces, comprising a base, a locking and referring system for a piece to be checked, detecting means with an optoelectronic system for providing signals indicative of the dimensions of the piece to be checked, a rotary structure, one of said locking and referring system and optoelectronic system being coupled to the rotary structure, and a system for the longitudinal displacement that is coupled to the base and defines a longitudinal axis, the rotary structure being fixed to the base or to the longitudinal displacement system for allowing longitudinal translation and reciprocal rotational displacements about the longitudinal axis between said piece and said optoelectronic system, the optoelectronic system providing said signals in the course of said reciprocal rotational displacements.

The invention also relates to an optoelectronic apparatus for the dimension and/or shape checking of pieces with abutment surfaces and a plurality of substantially plane and reciprocally parallel elements, comprising a base, a displacement system coupled to base that defines a longitudinal axis and comprises a slide for performing translation displacements in a direction parallel to said longitudinal axis, a rotary structure for performing rotational displacements about said longitudinal axis, a first driving system, coupled to the rotary structure f or controlling said rotational displacements , a first transducer for providing signals depending on the angular position of the rotary structure, a second driving system, coupled to the displacement system for controlling said translation displacements, a second transducer for providing signals depending on the position of slide with respect to base, an optoelectronic detecting system comprising a support with a substantially C shape, with two free ends and a central portion, and at least an emitter device and at least a receiver device coupled to the free ends of said support for emitting and receiving, respectively, a beam of light arranged in a plane substantially perpendicular to said longitudinal axis, and a locking and referring system for the piece to be checked with reference surfaces for cooperating with said abutment surfaces of the piece to be checked for defining the position of the piece.

BACKGROUND ART

Pieces with a complex shape are present, for example, in a hard disk storage unit of electronic processors. A similar storage unit comprises a "hard disk", that consists of a plurality of magnetic disks in which data are stored in sectors arranged in concentric tracks. The magnetic disks are mounted on a rotating spindle in such a way so as to be substantially parallel and generally equally spaced out with respect to each other.

A read/write unit for "hard disk" includes a support for magnetic read/write heads that comprises a certain number of thin plates or wings substantially arranged on parallel planes, each carrying at least a magnetic head, for example a Hall effect probe head, for reading/writing on one of the disks.

In order to enable the magnetic heads to read/write on all the sectors of the disk, the device for supporting the magnetic read/write heads is coupled with a motor—by means of a bearing—that provides its rotation about an axis perpendicular to the planes defined by the wings.

In order to ensure the proper operation of the read/write unit, the wings of the support for the magnetic read/write heads must be plane, parallel and arranged at prefixed distances from each other, and comply with very tight tolerance limits.

Optoelectronic apparatuses are utilized for the dimension and/or shape checkings of mechanical pieces. These apparatuses comprise, for example, an optoelectronic system—with a light emitter and an associated receiver for generating and receiving a beam of light—that rests on a base on which there also rests a support for the piece to be checked arranged in such a way so that the beam of light impinges upon the piece.

International patent application published under n. WO87/07007, for example, discloses an apparatus according to the preambles of claims 1 and 15, for contactlessly gauging mechanical pieces with rotational symmetry surfaces, for example crankshafts or camshafts. Such apparatus comprises a frame, two tailstocks, coupled to the frame, for referring and rotating the workpiece, a first optical measuring device, for dinamically checking diametral dimensions, and a second optical mesuring device for checking shoulders of the workpiece, i.e. surfaces that lie perpendicular to the axis of the workpiece.

European Patent Application n. EP-A-0686829 discloses an apparatus for checking crankshafts. The apparatus comprises a base, a headstock and a tailstock, coupled to the base, for referring and rotating the workpiece, and two groups of measuring heads with feelers for entering into contact with cylindrical surfaces of the workpiece and dinamically checking diametral dimensions while the crankshaft rotates about its longitudinal axis.

Even though these apparatuses are generally reliable, they do not guarantee the accuracy required for the checking of pieces with a complex shape, like the supports for the magnetic heads previously referred to, that is a checking becoming even more critical in consideration of the increasing requirement to miniaturize similar pieces.

DISCLOSURE OF INVENTION

Object of the present invention is to provide an apparatus for the dimension and/or shape checking of pieces with a complex tridimensional shape that is reliable, precise and particularly accurate, that does not cause piece deformations, in the course of the checking, and is flexible in use.

This and other objects are achieved by an apparatus wherein the locking and referring system is adapted for defining the arrangement of the piece, the latter having a complex tridimensional shape with wings defining the planar surfaces, in such a way so that the plurality of planar surfaces substantially lie on planes parallel to the longitudinal axis, the optoelectronic system being adapted to provide, in the course of the reciprocal rotational displacements, signals indicative of the position of the wings.

This and other objects are achieved by an optoelectronic apparatus wherein the rotary structure is coupled to the slide, the C-shaped support being fixed at its central portion to the rotary structure in such a way that its free ends can perform limited rotational displacements about the longitudinal axis in a plane substantially perpendicular to the longitudinal axis, and the locking and referring system includes an element with a surface that defines a reference plane for the optoelectronic detecting system, and a rapid locking device for cooperating with surfaces of the piece to be checked for defining and locking a position of the piece in such a way so that the substantially plane elements be substantially parallel to the reference plane, the apparatus further including a processing and control unit coupled to the optoelectronic system, to the first and second driving systems and to the first and second transducers for processing the signals sent by the optoelectronic system and by the transducers, and controlling the driving systems.

BRIEF DESCRIPTION OF THE DRAWINGS

The invention is now described in more detail with reference to the enclosed sheets of drawings, given by way of non limiting example, wherein.

BEST MODE FOR CARRYING OUT THE INVENTION

Figure 1:
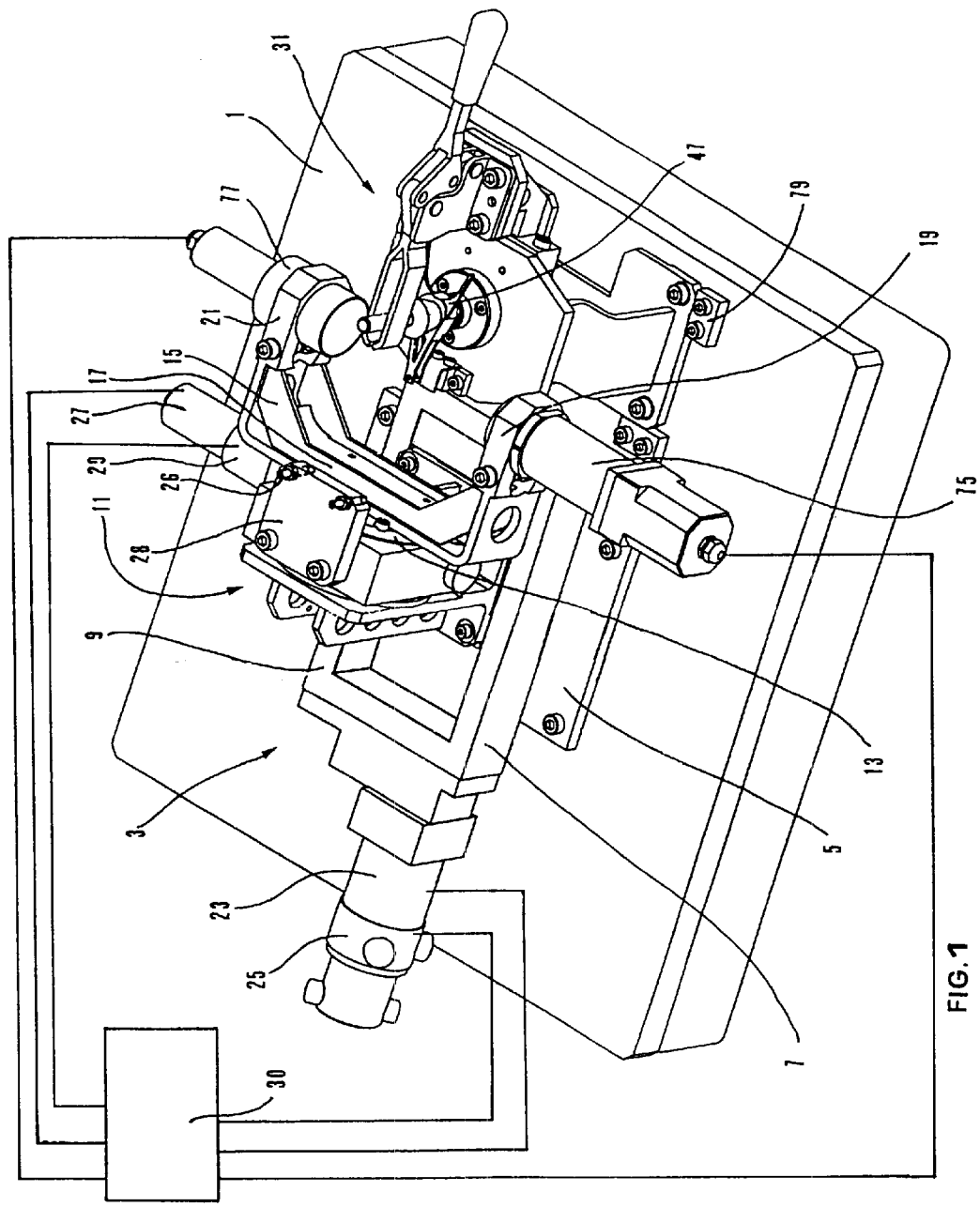
FIG. 1 is an axonometric view of an apparatus according to the invention.

The apparatus shown in FIG. 1 comprises a base 1 to which there is coupled a longitudinal displacement system 3 comprising a support 5, fixed to base 1, for example by means of screws, that has two guide elements 7 and 9 to which there is coupled a longitudinal slide 11 that supports a structure, more specifically a rotary table 13. A support 15, substantially C-shaped, carrying detecting means comprising an optoelectronic measuring system is fixed, for example by means of screws, at its central portion 17, to the rotary table 13 and carries at the free ends 19 and 21 the elements of the optoelectronic measuring system hereinafter described.

A first driving system, comprising a first motor 27, enables the rotary table 13 to rotate about an axis parallel to a direction defined by the guide elements 7 and 9. Small rotational displacements of the rotary table 13 in a clockwise and counterclockwise direction enable the ends 19 and 21 of support 15 carrying the optoelectronic measuring system to oscillate in a plane substantially perpendicular to the axis of rotation of rotary table 13. A limit block 28, fixed to slide 11, has two adjustable screws 26 with ends adapted for touching support 15 for limiting its oscillations in a clockwise and counterclockwise direction. A first rotary transducer, or encoder, 29 that provides signals depending on the angular position of the rotary table 13 and thus of the optoelectronic measuring system is coupled to motor 27. The longitudinal slide 11 can be displaced along the guide elements 7 and 9 by a second driving system comprising a second motor 23. A second rotary transducer, or encoder, 25 provides a signal depending on the position of the longitudinal slide 11 with respect to base 1.

The motors 23 and 27, the transducers 25 and 29 and the component parts of the optoelectronic system are coupled—in a known way that has not been shown in the drawings—to a power supply, control, processing and display unit 30. A system 31 for locking and referring a piece 47 to be checked is fixed to base 1, for example by means of screws. The locking and referring system can have different shape and structure, depending, for example, on the dimensions and the number of wings that the piece to be checked has, as described hereinafter.

Figure 2A:
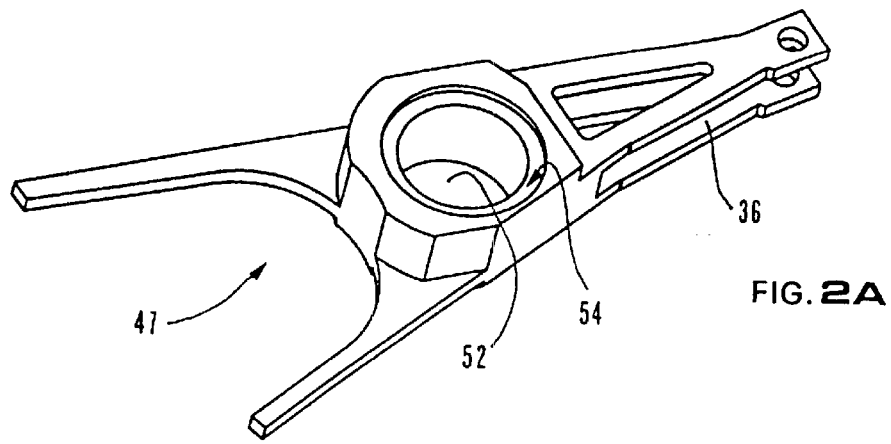
FIGS. 2A, 2B and 2C are axonometric views—shown in an enlarged scale with respect to that of FIG. 1—of three different pieces that can be checked by the apparatus shown in FIG. 1.
Figure 2B:
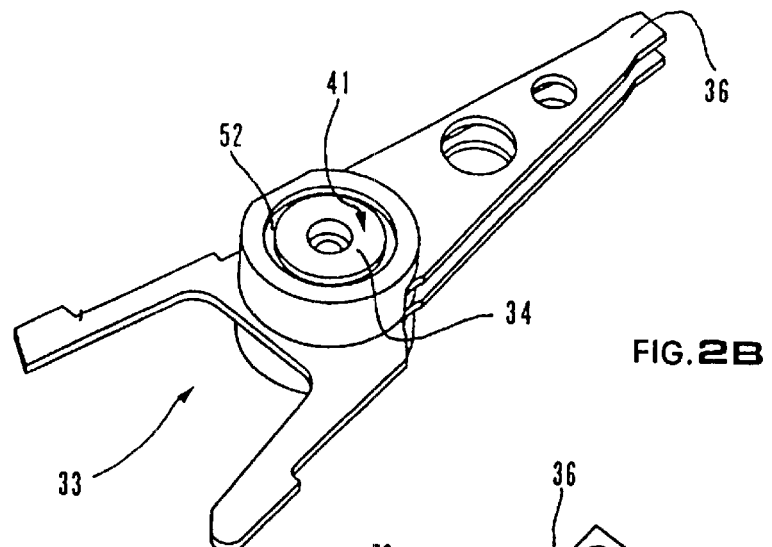
Figure 2C:
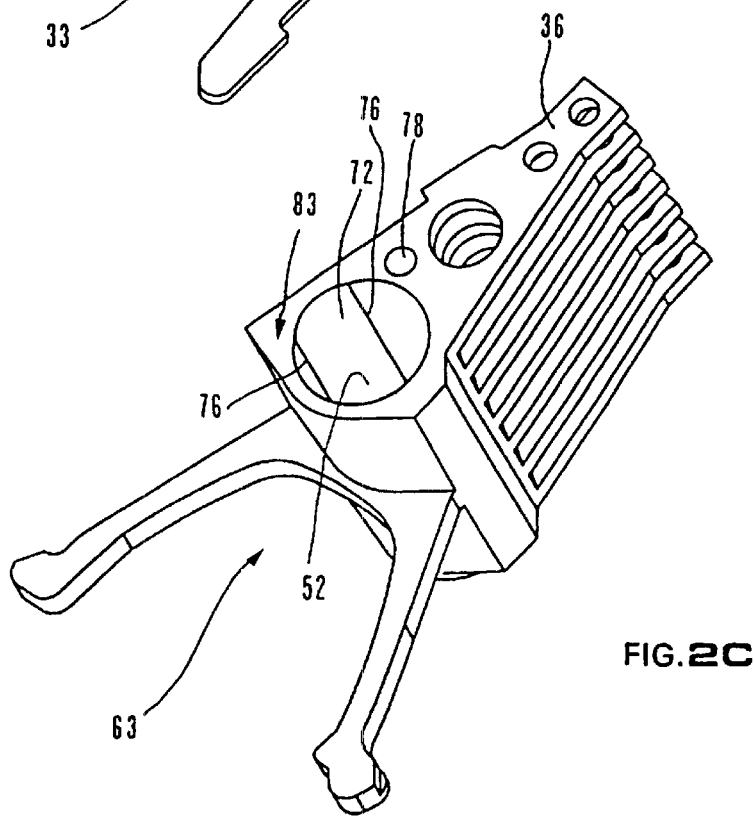

By way of example, FIGS. 2A, 2B and 2C show three pieces to be checked 47, 33 and 63 that have different shapes and dimensions. The pieces are component parts of hard disk storage units, and more specifically, they are supports for magnetic read/write heads (or "E-blocks"). Each support 33 and 47 has two substantially plane and parallel elements, or wings 36, while support 63 has seven wings. All the supports have through holes 52, that form seats for suitable bearings. Support 33, differently from the other two, undergoes checkings with a bearing 34 inserted in its associated seat 52. More specifically, bearing 34, for example a ball bearing of a known type, comprises an external and an internal ring that can rotate with respect to each other about a common axis, the external ring being rigidly coupled to seat 52.

Three different locking and referring systems utilized for the three pieces illustrated in FIGS. 2A, 2B and 2C are now described with reference to FIGS. 3–8.

Figure 3:
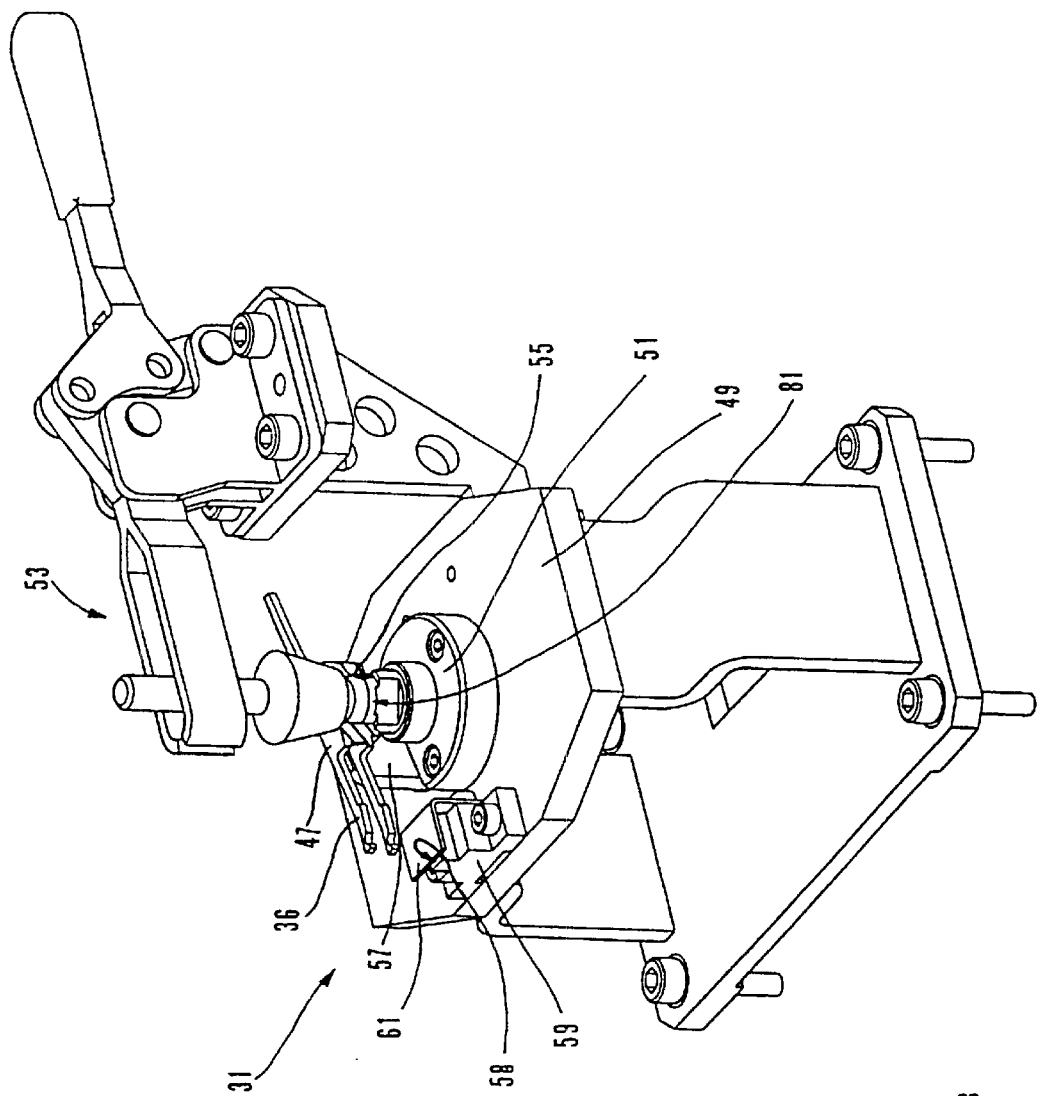
FIG. 3 is an axonometric view of the system for locking and referring the piece of the apparatus illustrated in FIG. 1, shown in an enlarged scale with respect to that of FIG. 1 and in which the piece is cross-sectioned.

The system 31 for locking and referring piece 47, illustrated in FIG. 3 (and also shown in FIG. 1), comprises a worktable 49, coupled to base 1, for example by means of screws, on which there is mounted a nosepiece 51 with a cylindrical centering surface 81 for being inserted in hole 52 of the support for the magnetic read/write heads 47. A rapid locking device, in particular a lever type vertical presser 53, applies pressure to an upper surface of piece 47 (that is arranged upside-down with respect to FIG. 2A) so as to keep an annular reference surface 54—defined by a recess in hole 52, as shown in FIG. 2A—in contact with three surface portions 55 of nosepiece 51, two only shown in FIG. 3. An antirotation block 57, coupled to nosepiece 51, prevents piece 47 from accidentally rotating in the course of the checking. A reference block 59, coupled to the worktable 49, comprises a surface 58 that defines a reference plane r for the optoelectronic measuring system, the function of which will be explained hereinafter when the operation of the apparatus is described. A protection element 61 protects reference block 59 from dust or other foreign matter possibly depositing on the surface 58 and hence preventing the optoelectronic system from properly detecting the reference plane r.

Therefore, the locking and referring system 31 identifies and fixes the position of support 47 to be checked, in particular the angular position of the surfaces of wings 36 with respect to the reference plane r, by the cooperation between the annular surface 54 and a reference plane defined by the surface portions 55 and parallel to the surface 58 of block 59.

Figure 4:
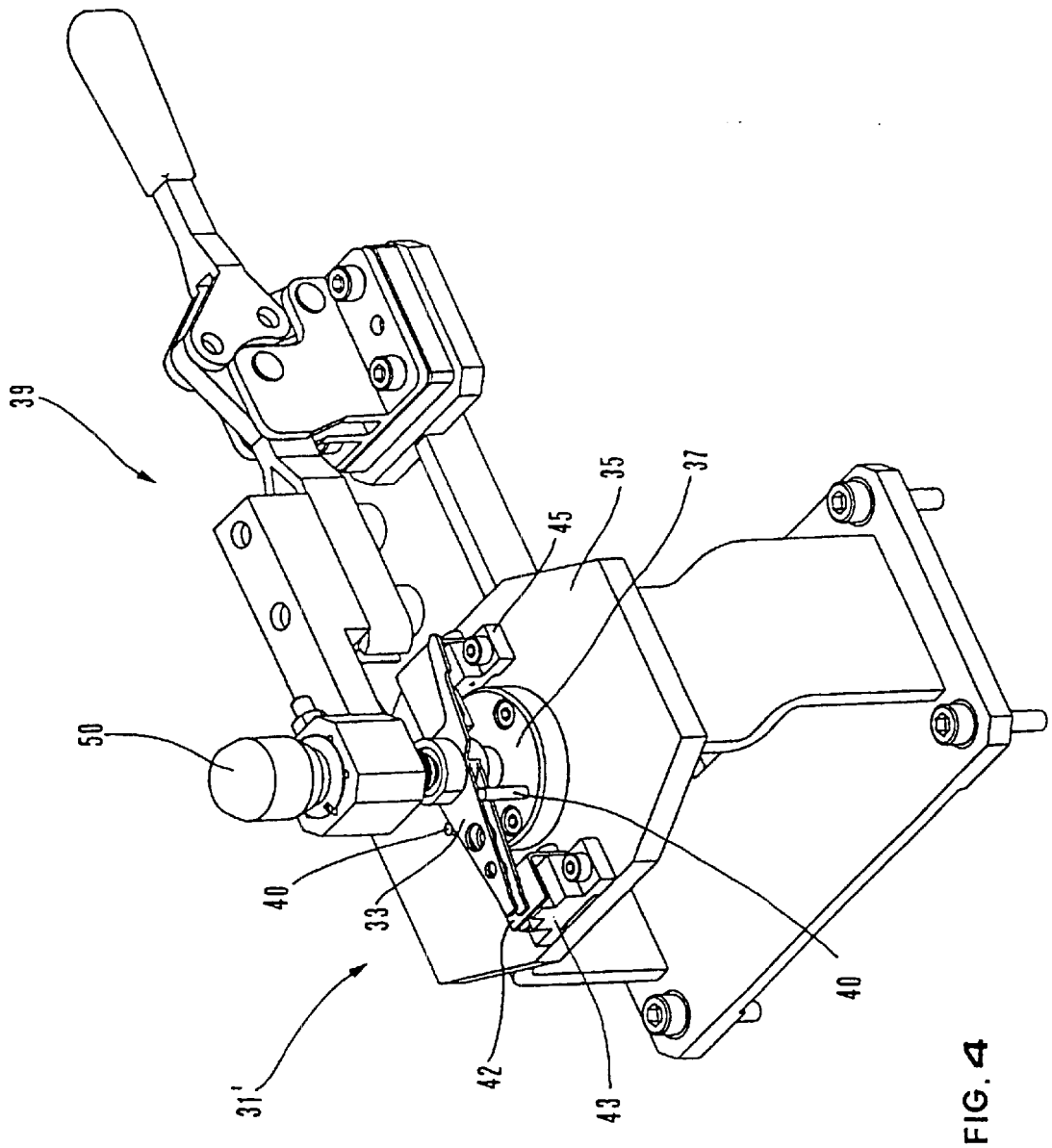
FIG. 4 is an axonometric view of a second system for locking and referring the piece.
Figure 5:
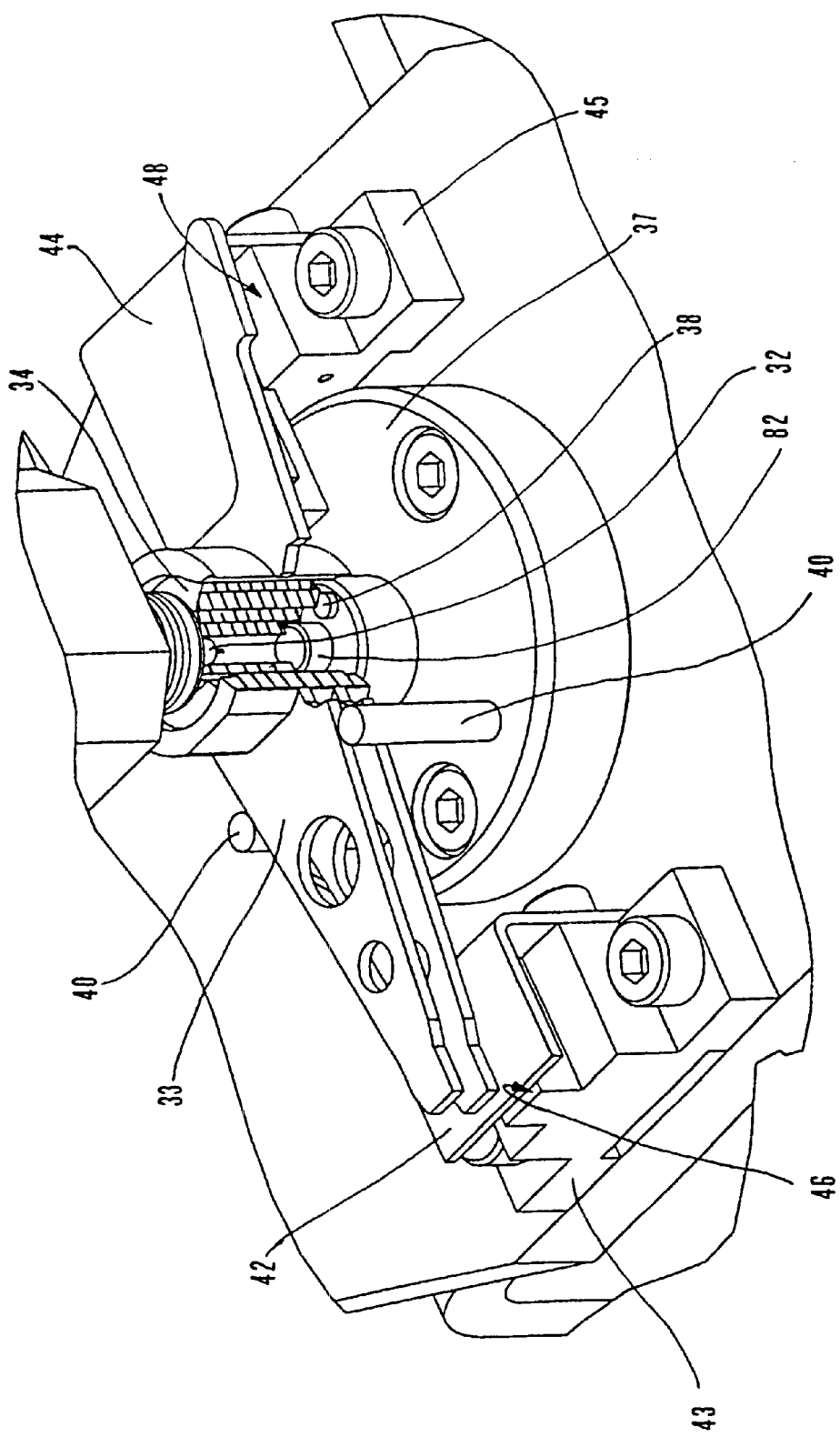
FIG. 5 is an enlarged scale view of a detail of the second system for locking and referring the piece shown in FIG. 4, in which the piece is partially shown cross-sectioned.

The system 31' for locking and referring piece 33, shown in FIGS. 4 and 5, comprises a worktable 35, coupled to base 1, for example by means of screws, on which there is mounted a centering nosepiece 37 in which there is positioned piece 33, overturned with respect to FIG. 2B. More specifically, nosepiece 37 comprises, apart from a cylindrical element 82 that is housed in the central hole of bearing 34 for defining the transversal position of the piece, three vertical pins 38—only one shown in FIG. 5—arranged 120° apart with end surfaces substantially coplanar for the resting of an annular abutment surface 41 of bearing 34 (FIG. 2B). A rapid locking device, more specifically a lever presser, 39 applies a vertical thrust to piece 33 so as to keep surface 41 in contact with the three pins 38, and has a center 32, driven by a knob 50, that can rotate about a vertical axis. The center 32 contacts the internal ring of bearing 34 and makes it rotate with respect to the external ring, that is stationary in hole 52, for performing checkings in a number of mutual angular positions corresponding to a number of operative positions of support 33. Two pins 40, fixed to nosepiece 37, laterally lock the wings 36, hence preventing piece 33 from rotating during the checking. Two reference blocks 43 and 45, fixed to the worktable 35, include surfaces 46 and 48 that define a reference plane r' for the optoelectronic measuring system, which performs the same function as that of reference plane r defined by surface 58 shown in FIG. 3, hereinafter described. Two protection elements 42 and 44 protect blocks 43 and 45.

In the same manner as for the locking and referring system 31 hereinbefore described, system 31' too identifies and fixes the angular position of the surfaces of wings 36 of the piece to be checked (in this case support 33) with respect to reference plane r', by the cooperation between a surface stationary with respect to the piece and a reference plane defined by surface portions (the three pins 38) of nosepiece 37 and parallel to surfaces (46 and 48) of reference blocks (43 and 45). The aspect that in this case differs is that the surface stationary with respect to piece 33 utilized for defining its angular position is a surface (41) of bearing 34 housed in hole 52.

Figure 6:
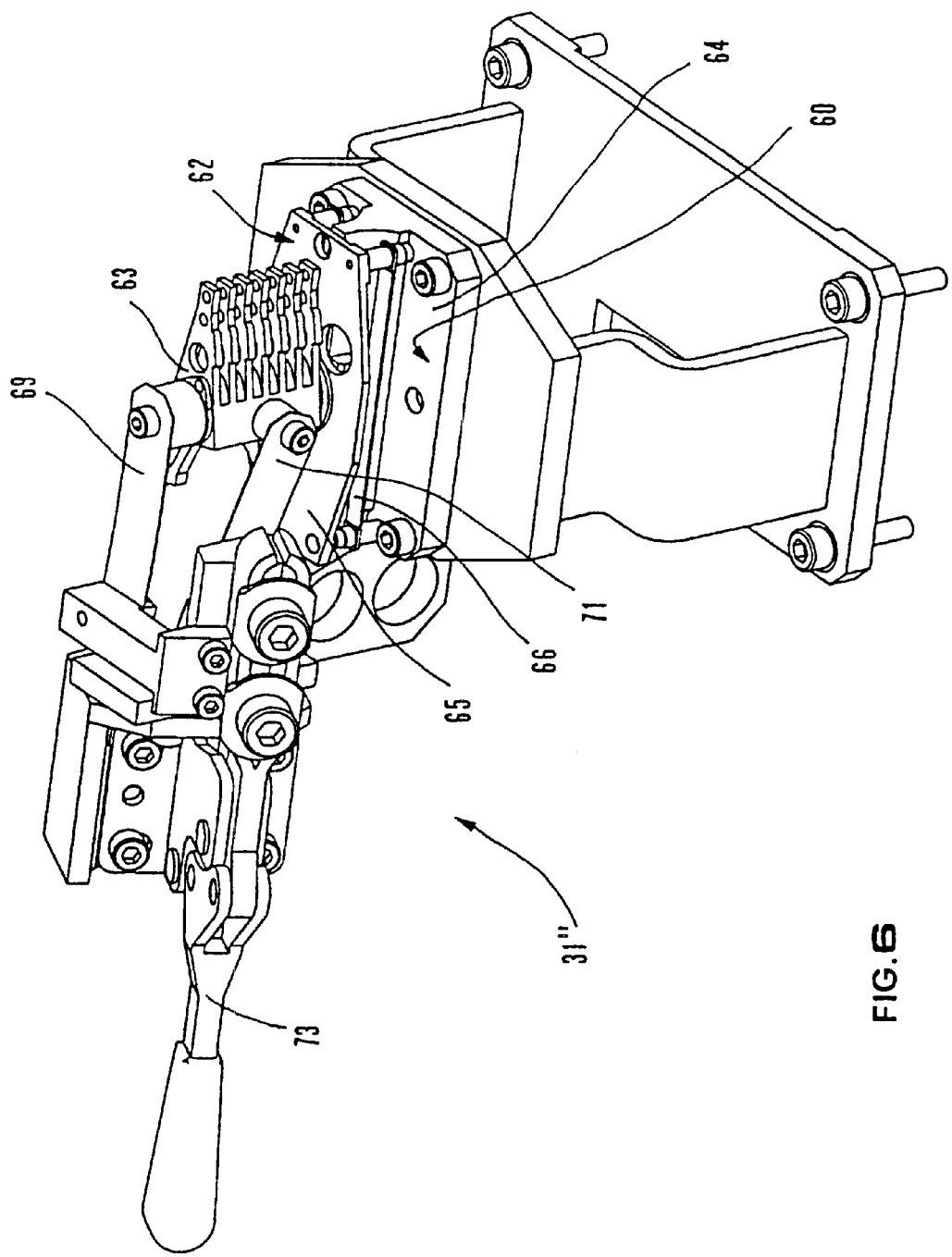
FIG. 6 is an axonometric view of a third system for locking and referring the piece.
Figure 7:
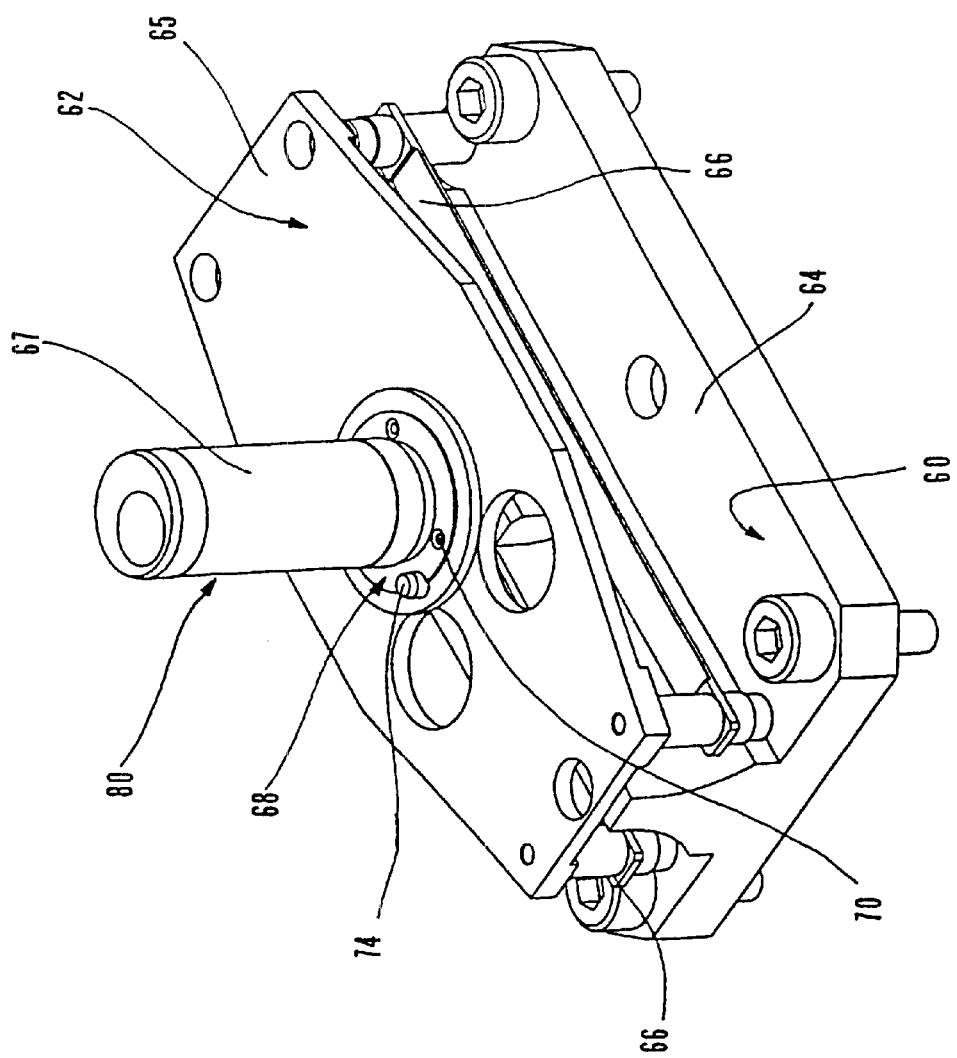
FIG. 7 is an enlarged scale axonometric view of a detail of the system for locking and referring the piece shown in FIG. 6.

The system 31" for locking and referring piece 63, illustrated in FIGS. 6 and 7, comprises a reference block 64 on which there is mounted—by means of two leaf springs 66—a floating plate 65. The surfaces 60 and 62 of block 64 and. plate 65, define, respectively, in the same way as surfaces 46, 48 and 58 defined with reference to the locking and referring systems 31 ' and 31, reference planes r" and r'" for the optoelectronic measuring system. A nosepiece 67, fixed with respect to block 64, defines an annular, substantially plane surface 68 that forms a rest for piece 63, and a cylindrical surface 80 that defines an axis perpendicular to surface 60 and that is housed in hole 52 of piece 63, the latter being overturned with respect to FIG. 2C. The hole 52 has an internal, substantially cylindrical, surface with an eccentric portion 72 that defines two abutment edges 76 shown in FIG. 2C. A rapid locking device with two pressers, a vertical one 69 and a lateral one 71, simultaneously actuated by a lever 73, urges piece 63 both downwards, against annular surface 68, and in a transversal direction, by bringing and keeping the two edges 76 urged against the cylindrical surface 80 of nosepiece 67. The lateral presser 71 may be replaced by a lever, connected to the nosepiece 67 and mostly included in its overall dimensions, for exerting a thrust on the internal surface of piece 63 in order to keep the edges 76 urged against nosepiece 67. Three pins 70 (only two are shown in FIG. 7), fixed to the floating plate 65, contact an annular abutment surface 83 of piece 63 and enable the formerly mentioned plate 65 to position itself parallel to this surface 83, at a known distance set by the dimensions of pins 70.

A pin 74, fixed to floating plate 65, engages in an associated hole 78 obtained in piece 63 for preventing it from possibly rotating in the course of the checking. The locking and referring system 31" identifies and fixes the position of support 63 to be checked, in particular the angular position of the surfaces of wings 36 with respect to reference planes r" and r'". More specifically, the cooperation of the edges 76 with the cylindrical surface 80 of nosepiece 67 makes piece 63 be in a position in which the axis of hole 52 for housing the bearing is parallel to the axis of this cylindrical surface 80 and, consequently, perpendicular to surface 60 of block 64 (reference plane r"). Moreover, as herein previously mentioned, the arrangement and the dimensions of pins 70 cause the lower surface of support 63—that contacts said pins 70 and surface 62 of the floating plate 65 (reference plane r'")—to arrange in reciprocally parallel positions.

It should be realized that each of the three systems 31, 31 ' and 31" for locking and referring the piece, herein described and illustrated can be mounted on base 1 in an interchangeable way. In order to facilitate this operation, there are three positioning blocks 79, two only of which are shown in FIG. 1, fixed to base 1. These blocks 79 enable a rapid and accurate positioning of the locking and referring systems 31, 31 ' and 31" before they are coupled to base 1 by means of screws.

Systems 31, 31 ' and 31" are examples that show how different surfaces and references provide to accurately define the position of the surfaces of the wings 36 to be checked. The choice of one or another system generally depends on the operating conditions that the support to be checked (33, 47 or 63) is intended for, in other terms by the references that determine the actual angular position of the support in the course of the operation in its associated hard disk storage unit.

Locking and referring systems different with respect to those herein illustrated and described can be foreseen for referring and orienting pieces that have different characteristics with respect to supports 33, 47 and 63 that, as a mere example, have been considered it this description.

The optoelectronic measuring system, for example of the known shadow casting type (shown in FIG. 1) comprises an infra-red radiation emitter device 75 and a receiver, or photosensitive device, 77 of the CCD ("Charge Coupled Device") type.

Fundamentally, a shadow casting device comprises an emitter device emitting light and directing it towards a receiver with arrays of photosensors (e.g. of the CCD type). A mechanical part interposed between emitter and receiver partially intercepts the light and only the non-intercepted portion of the light reaches a receiver device. The photosensors are electronically scanned and, by means of proper processings, a dimension of the intercepting part, or its deviation with respect to a nominal value, is calculated.

The emitter device 75 is fixed to an end 19 of support 15, while receiver 77 is fixed to the other end 21 of support 15 in such a way that light is directed substantially along a plane perpendicular to the axis of rotation of rotary table 13.

The light beam is emitted by emitter 75 in the direction of the piece. The piece partially intercepts the beam and the portion of the beam that is not intercepted reaches receiver 77. Depending on the position of the illuminated edges of the piece projected upon receiver 77, it is possible to calculate -by suitable electronic processings—the dimensions of the piece, or their deviations with respect to the nominal dimensions.

The apparatus according to the invention can be utilized for performing distance, torsion or flexure checkings of the wings of supports 33, 47 and 63.

Figure 8:
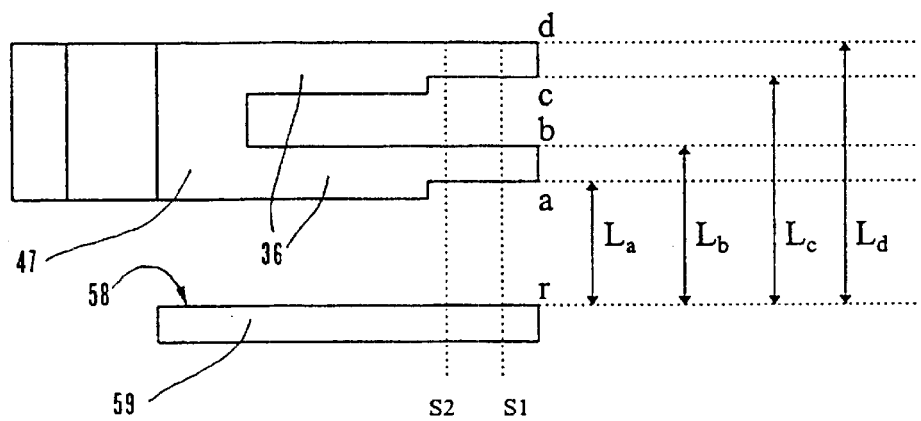
FIG. 8 schematically shows a piece that can be checked by the apparatus shown in FIG. 1 and the reference plane for the checkings.
Figure 9:
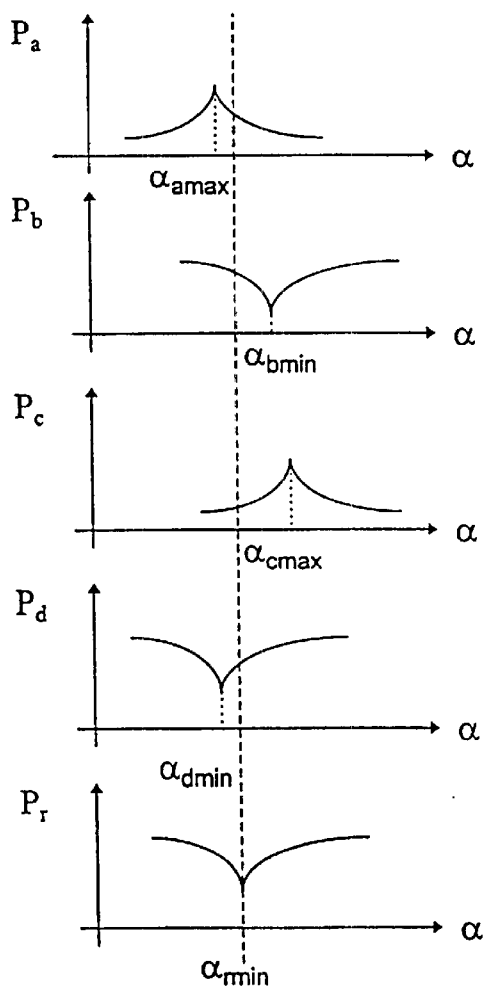
FIG. 9 shows, in graphic form, some checkings performed by an apparatus according to the invention.

The operation of the apparatus is now described with reference—for the sake of simplicity—just to the support for the magnetic read/write heads 47, that has two wings 36, according to FIGS. 8 and 9.

Before starting the piece checking operation, the apparatus undergoes a calibration cycle performed by using a master piece. Then the master piece is replaced with piece 47 to be checked.

Motor 23 controls the displacements of the longitudinal slide 11 along the guide elements 7 and 9, until encoder 25 signals that the slide 11 has reached the position in which the optoelectronic measuring system is at a section S1.

Motor 27 controls small, clockwise and counter-clockwise, rotational displacements of the rotary table 13, by making the components of the optoelectronic measuring system 75 and 77 oscillate substantially in the plane of section Si. In the course of these oscillations, the optoelectronic measuring system detects the spatial position of the lower surfaces a, c and upper surfaces b, d of the wings 36 and that of the reference plane r defined by surface 58 of reference block 59, previously described when referring to FIG. 3 and to the locking and referring system 31. The detected data are processed by the power supply, control, processing and display unit 30, thus obtaining, for each plane, a regression curve $P_a(\alpha)$, $P_b(\alpha)$, $P_c(\alpha)$, $P_d(\alpha)$, $P_r(\alpha)$ representative of the variations of the position of each plane depending on the oscillation angle $\alpha$ of the table 13, detected by encoder 29.

Each of these curves has a maximum value (in the case of a curve relating to a lower plane), or a minimum value (in the case of a curve relating to an upper plane), at the oscillation angle $\alpha_{max}$ or $\alpha_{min}$ at which the direction of the light beam is parallel to the associated plane. The aligning of the optoelectronic system with the reference plane r, in other terms the angular position of the rotary table 13 at which the direction of the light beam is parallel to plane r, is thus determined by angle $\alpha_{min}$ of rotary table 13 at which the regression curve $P_r(\alpha)$ relating to the reference plane has a minimum value. At that angle $\alpha_{min}$, the differences between the values taken by the regression curves relating to the surfaces of the wings 36 $P_i(\alpha_{min})$, (i=a, b, c, d) and the value taken by the regression curve relating to the reference plane $P_r(\alpha_{min})$ represent the distances $L_i$ (i=a, b, c, d) of the planes of the wings from the reference plane r. These values enable to obtain the distance existing among the wings 36.

An apparatus according to the invention also enables to detect shape errors of the supports 33, 47 and 63, as parallelism errors of the surfaces of the wings 36 with respect to the reference plane r. In particular, it is possible to check flexures ("bend") and torsions ("twist") of the surfaces of wings 36 with respect to the reference plane r, that represent the parallelism errors along the plane of FIG. 8 and along the plane substantially according to the direction of the light beam, respectively.

In order to determine the "twist" of a surface of a wing 36 with respect to the reference plane r, it is sufficient to calculate the difference existing between the angle at which the regression curve relating to the surface taken under consideration has the maximum/minimum value ($\alpha_{amax}$, $\alpha_{bmin}$, $\alpha_{cmax}$, $\alpha_{dmin}$) and the angle at which the regression curve relating to reference plane r has the minimum value $\alpha_{min}$ and multiply the value thus obtained by the nominal width of wing 36 at the measuring section.

Hence, with a single oscillation it is possible to detect the data necessary for calculating the distances among the wings 36 and the torsions of the wings 36 with respect to the reference plane.

In order to calculate the "bend", it is necessary to perform the same oscillation operation at two distinct cross-sections S1 and S2 and calculate the difference between the values Li (i=a, b, c, d, e, f) obtained at the two cross-sections. In this case, after the first oscillation of the optoelectronic system at cross-section S1, the motor 23 controls a translation of slide 11 along the guide elements 7 and 9 until there is reached the position—monitored by encoder 25—in which the optoelectronic measuring system is at cross-section S2 where the second oscillation is performed.

Thus, by accomplishing two complete oscillations and a translation of the optoelectronic system along a longitudinal axis parallel to the guide elements 7 and 9, it is possible to obtain the data necessary for the distance checking of the wings, and the "twist" and "bend" of the single wings with respect to a reference plane. These checkings can be performed even by a single oscillation in the event there are utilized two separate emitter-receiver pairs along a direction parallel to the guide elements 7 and 9, substantially at the cross-sections S1 and S2.

In an entirely identical way the checkings of supports 33 and 63 are carried out.

With reference to the latter, it should be realized that, while checkings relating to flexures and torsions are generally referred to plane r", the checking of the distance among wings 36, may, as an alternative, be referred to plane r'" defined by the floating plate 65 in the event, for example, it be necessary to check the position of wings 36 with respect to surface 83.

An optoelectronic system like the one herein described, comprising just one pair emitter 75/receiver 77, covers a limited measuring range (typical value: 20 mm) and does not enable the checking of particularly "high" pieces, as, for example, support 63 shown in FIG. 2C. In this case, the optoelectronic system coupled to support 15 may comprise, for example, two emitters and two receivers with partially overlapping ranges, according to a known method, for guaranteeing the continuity of the light beam along the directions in which the checkings are performed.

The apparatus according to the invention enables the extremely precise, reliable and accurate checking of pieces with different features and dimensions by performing simple and rapid retooling operations. In particular, in order to switch from the checking of one type of piece to that of another, it is sufficient to replace the system 31, 31 ' and 31" for locking and referring the piece, that is simply fixed to the base by means of screws, and/or depending on the dimensions of the piece, support 15 for the components of the optoelectronic measuring system, also simply fixed to the rotary table 13 by means of screws.

The scope of the present invention also includes apparatuses differently featured with respect to what has been hereinbefore described and illustrated. For example, the locking and referring systems 31, 31', 31", may comprise a lever type vertical presser, substantially similar to the ones (53, 39, 69) shown in the drawings, including a self-centering device, in order to avoid that the thrust of the presser on the piece generate forces in directions different from the vertical one. The self-centering device can be of a known type including a hollow element housing a ball adapted to touch a reference surface of the piece. Moreover support 15 for the optoelectronic measuring system can be rigidly fixed to base 1, while the system for locking and referring the piece (31, 31', 31") can be fixed to the rotary table 13, coupled to the longitudinal slide 11, in order to keep the substantially vertical arrangement shown in the figures. In this case, the components of the optoelectronic system 75, 77 are stationary with respect to base 1, while the piece can oscillate and translate in a longitudinal direction in order to be checked at different cross-sections.

As an alternative, the rotary table 13 can be directly coupled to base 1, instead of being coupled to slide 11, while support 15 of the optoelectronic system and the system for locking and referring the piece (31, 31', 31") are coupled to slide 11 and to rotary table 13, or vice versa.

The herein described apparatus can also be utilized for the contactless checking of pieces that have a different shape and function with respect to those described.

What is claimed is:

1. An optoelectronic apparatus for at least one of dimension and shape checking of pieces with a plurality of substantially planar and mutually parallel surfaces, comprising:
    a base;
    a locking and referring system for a piece to be checked,
    a detector with an optoelectronic system for providing signals indicative of the dimensions of the piece to be checked;
    a rotary structure, one of said locking and referring system and optoelectronic system being coupled to the rotary structure, and
    a system for the longitudinal displacement, that is coupled to the base and defines a longitudinal axis,
    the rotary structure or the locking and referring system being fixed to the longitudinal displacement system for allowing longitudinal translation and reciprocal rotational displacements about the longitudinal axis between said piece and said optoelectronic system, the optoelectronic system providing said signals in the course of said reciprocal rotational displacements,
    wherein the locking and referring system is adapted for defining the arrangement of the piece, the latter having a complex tridimensional shape with wings defining said planar surfaces, in such a way so that said plurality of planar surfaces substantially lie on planes parallel to said longitudinal axis, the optoelectronic system being adapted to provide, in the course of said reciprocal rotational displacements, signals indicative of the position of the wings.

2. An optoelectronic apparatus according to claim 1, wherein said detector comprises a support, substantially C-shaped, for the optoelectronic system, said support and the locking and referring system being fixed to the rotary structure and the base, respectively.

3. An optoelectronic apparatus according to claim 2, wherein said longitudinal displacement system comprises a slide, movable along said longitudinal axis, said rotary structure being carried by said slide.

4. An optoelectronic apparatus according to claim 3, wherein the longitudinal displacement system, comprises two guide elements.

5. An optoelectronic apparatus according to claim 3, comprising a first driving system with a first motor coupled to the rotary structure, for controlling rotations of the rotary structure about said longitudinal axis.

6. An optoelectronic apparatus according to claim 5, comprising a first rotary transducer, associated with the first motor, for providing signals depending on the angular position of the rotary structure.

7. An optoelectronic apparatus according to claim 6, comprising a second driving system with a second motor coupled to the longitudinal displacement system for controlling displacements of said slide.

8. An optoelectronic apparatus according to claim 7, comprising a second transducer, associated with the second motor, for providing signals depending on the position of said slide with respect to the base.

9. An optoelectronic apparatus according to claim 2, wherein the optoelectronic system comprises an emitter device and a receiver device fixed to support in opposite positions with respect to the piece to be checked.

10. An optoelectronic apparatus according to claim 2, wherein said optoelectronic system comprises a plurality of emitter devices and a plurality of receiver devices fixed to support in opposite positions with respect to the piece to be checked.

11. An optoelectronic apparatus according to claim 9, wherein said emitter device is an infra-red diode and said receiver device is a CCD type photodetector.

12. An optoelectronic apparatus according to claim 1, wherein the locking and referring system comprises an element that defines a reference plane for the optoelectronic system.

13. An optoelectronmc apparatus according to claim 12, wherein the locking and referring system comprises reference surfaces for cooperating with abutment surfaces of the piece to be checked for defining the position of the piece with respect to said reference plane.

14. An optoelectronic apparatus according to claim 13, wherein the locking and referring system comprises rapid locking devices for cooperating with surfaces of the piece to be checked for locking said position of the piece with respect to the reference plane.

15. An optoelectronic apparatus according to claim 1 for dimension and shape checking of pieces with a plurality of substantially planar and mutually parallel surfaces.

16. An optoelectronic apparatus for at least one of dimension and shape checking of pieces with abutment surfaces and a plurality of substantially plane and reciprocally parallel elements, comprising:
    a base,
    a displacement system coupled to base that defines a longitudinal axis and comprises a slide for performing translation displacements in a direction parallel to said longitudinal axis,
    a rotary structure for performing rotational displacements about said longitudinal axis,
    a first driving system, coupled to the rotary structure for controlling said rotational displacements,
    a first transducer for providing signals depending on the angular position of the rotary structure,
    a second driving system, coupled to the displacement system for controlling said translation displacements,
    a second transducer for providing signals depending on the position of slide with respect to base,
    an optoelectronic detecting system comprising a support with a substantially C shape, with two free ends and a central portion, and emitter and receiver devices coupled to the free ends of said support for emitting and receiving, respectively, a beam of light arranged in a plane substantially perpendicular to said longitudinal axis, and a locking and referring system for the piece to be checked with reference surfaces for cooperating with said abutment surfaces of the piece to be checked for defining the position of the piece, wherein the rotary structure is coupled to said slide, the C-shaped support being fixed at its central portion to the rotary structure in such a way that its fee ends can perform limited rotational displacements about the longitudinal axis in a plane substantially perpendicular to said longitudinal axis, and the locking and referring system includes an element with a surface that defines a reference plane for the optoelectronic detecting system, and a rapid locking device for cooperating with surfaces of the piece to be checked for defining and locking a position of the piece in such a way so that said substantially plane elements be substantially parallel to said reference plane, the apparatus further including a processing and control unit coupled to said optoelectronic system, to said first and second driving systems and to said first and second transducers for processing the signals sent by the optoelectronic system and by the transducers, and controlling the driving systems.

17. An optoelectronic apparatus according to claim 16, wherein the emitter device and the receiver device are coupled to said support in such a way that the direction of the beam of light, at an angular position of the rotary structure, arranges itself parallel to said reference plane, said processing and control unit processing, in the course of the rotational displacements of the rotary structure, signals arriving from the optoelectronic detecting system and from the first transducer for detecting said angular position.

18. An optoelectronic apparatus according to claim 17, wherein the optoelectronic detecting system provides, in the course of the rotations of the rotary structure, signals indicative of the distance between surfaces of said substantially plane elements of the piece to be checked and said reference plane, the processing and control unit processing said signals and detecting their value at said angular position of the rotary structure.

19. An optoelectronic apparatus according to claim 16 for dimension and shape checking of pieces with abutment surfaces and a plurality of substantially plane and reciprocally parallel elements.

20. An optoelectronic apparatus for at least one of dimension and shape checking of pieces having complex tridimensional shape with wings defining a plurality of substantially planar and mutually parallel surfaces, comprising:

a supporting system, with a base, a rotary structure and a system for the longitudinal displacement that defines a longitudinal axis, a locking and referring system for a piece to be checked, adapted for defining the arrangement of the piece in such a way so that said plurality of planar surfaces substantially lie on planes parallel to said longitudinal axis, and detecting devices, with an optoelectronic system for providing signals indicative of the dimensions of the piece to be checked, wherein the locking and referring system and the optoelectronic system are coupled to the supporting system for allowing mutual longitudinal translation and reciprocal rotational displacements about the longitudinal axis, the optoelectronic system providing, in the course of said reciprocal rotational displacements, signals indicative of the position the wings.

* * * * *